United States Patent [19]
Kashio et al.

[11] Patent Number: 5,776,637
[45] Date of Patent: Jul. 7, 1998

[54] VINYLIDENE FLUORIDE POLYMER-BASED BINDER SOLUTION AND ELECTRODE-FORMING COMPOSITION

[75] Inventors: Hidetora Kashio; Katsuo Horie; Aisaku Nagai; Tomoyuki Aita; Hiroshi Kitagoh, all of Iwaki, Japan

[73] Assignee: Kureha Kagaku Kogyo Kabushiki Kaisha, Tokyo, Japan

[21] Appl. No.: 804,150

[22] Filed: Feb. 20, 1997

[30] Foreign Application Priority Data

Feb. 22, 1996 [JP] Japan ................. 8-062040
Oct. 23, 1996 [JP] Japan ................. 8-297868

[51] Int. Cl.⁶ .................................. H01M 4/64
[52] U.S. Cl. ........................................ 429/217
[58] Field of Search ................. 429/217, 233; 29/623.1; 525/356

[56] References Cited

U.S. PATENT DOCUMENTS 4,650,833  3/1987  Sakagami et al. ............ 525/356
4,784,915  11/1988  Sakagami et al. ............ 428/421
5,607,485  3/1997  Gozdz et al. ................. 29/623.5

*Primary Examiner*—M. Nuzzolillo
*Attorney, Agent, or Firm*—Wenderoth, Lind & Ponack, L.L.P.

[57] ABSTRACT

A binder solution for providing an electrode suitable for use in non-aqueous-type electrochemical devices, such as a battery and an electric double layer capacitor, is formed by dissolving a vinylidene fluoride polymer having an inherent viscosity (and thus a polymerization degree) higher than a conventional level in an organic solvent. An electrode-forming composition is formed by dispersing powdery electrode material in the binder solution and is applied onto an electroconductive substrate while avoiding the gelation of the polymer, followed by drying, to form a composite electrode layer, which retains the powdery electrode material at a smaller amount of vinylidene fluoride polymer than a conventional level and is well resistant to a non-aqueous electrolytic solution.

11 Claims, 3 Drawing Sheets a non-aqueous-type (secondary) battery, particularly a lithium ion battery, or an electric double layer capacitor; and an electrode structure or an electrode sheet, and further a non-aqueous-type battery, respectively obtained therefrom.

5,776,637

VINYLIDENE FLUORIDE POLYMER-BASED BINDER SOLUTION AND ELECTRODE-FORMING COMPOSITION

FIELD OF THE INVENTION AND RELATED ART

The present invention relates to a binder solution and an electrode-forming composition for forming an electrode suitable for use in a non-aqueous electrolytic solution within a non-aqueous-type electrochemical device, such as a non-aqueous-type (secondary) battery, particularly a lithium ion battery, or an electric double layer capacitor; and an electrode structure or an electrode sheet, and further a non-aqueous-type battery, respectively obtained therefrom.

Accompanying the reduction in size and weight of electronic apparatus and devices in recent years, there has been a remarkably increasing demand for reduction in size and weight of a battery as a power supply for such electronic apparatus and devices. In order to generate a larger energy from a battery of small volume and weight, it is desirable to generate a higher voltage from one battery. From this viewpoint, much attention has been called to a battery using a non-aqueous electrolytic solution in combination with a negative electrode substance comprising, e.g., lithium or a carbonaceous material capable of being doped with lithium ions, and a positive electrode active substance comprising, e.g., a lithium-cobalt oxide.

However, in such a non-aqueous-type battery, the non-aqueous electrolytic solution shows only a low ionic conductivity on the order of $10^{-2}$–$10^{-4}$ S/cm compared with an ordinary level ionic conductivity of ca. $10^{-1}$ S/cm in an aqueous electrolytic solution, so that it becomes essential to use an electrode (layer) in a small thickness of several μm to several hundred μm and in a large area. As a method of economically obtaining such a thin and large-area electrode, it has been known to disperse a powdery electrode material comprising an electrode active substance in a binder solution obtained by dissolving an organic polymer functioning as a binder for the powdery electrode material to form an electrode-forming composition and applying the composition onto an electroconductive substrate, such as a metal foil or a metal net, followed by drying to form a composite electrode layer.

Further, such a structure comprising a thin electrode layer of a powdery electrode material and a resinous binder on an electroconductive substrate is similarly used as an electrode structure for an electric double layer capacitor (e.g., as disclosed in Japanese Laid-Open Patent Application (JP-A) 7-82450).

As such a binder solution for forming electrodes used in non-aqueous-type electrochemical devices, such as a non-aqueous-type battery and an electric double layer capacitor, those obtained by dissolving various grades of vinylidene fluoride polymers in polar solvents, such as N-methyl-2-pyrrolidone, dimethylformamide, N,N-dimethylacetamide have been known as disclosed in Japanese Laid-Open Patent Application (JP-A) 6-93025 and U.S. Pat. No. 5,415,958. This is because a vinylidene fluoride polymer is excellent in chemical resistance, weatherability, anti-staining property, etc., is soluble in a polar solvent as described above but is stable against a non-aqueous electrolytic solution while it is swollen to some extent within such a non-aqueous electrolytic solution. Further, a vinylidene fluoride polymer can retain a good adhesion onto a substrate of metal, etc., by copolymerization or modification.

However, in the resultant composite electrode layer, the binder does not substantially contribute to electro-chemical performances of the electrode, so that the amount of use thereof should be minimized to the utmost, and accordingly the binder is required to well hold the powdery electrode material and exhibit a good adhesion onto the electroconductive substrate even in a small amount. The binder is generally electrically insulating so that the use thereof in an increased amount results in a larger internal resistance of the electrode. Also from this viewpoint, the binder is required to exhibit its performances in as small an amount as possible.

However, as is understood from the above description, the performances of a vinylidene fluoride polymer as an electrode-forming binder in a non-aqueous-type electrochemical device can be attained based on a delicate balance between the solubility thereof in a polar solvent and the durability thereof in a non-aqueous electrolytic solution, so that the reduction in amount of use thereof as the binder has been considered to have a certain limit of itself. For example, if the molecular weight of a vinylidene fluoride polymer is lowered, the solubility thereof in a polar solvent is of course increased but the durability thereof in a non-aqueous electrolytic solution is remarkably impaired thereby. On the other hand, an increase in molecular weight of a vinylidene fluoride polymer remarkably lowers the solubility of the vinylidene fluoride polymer in a polar solvent and provides a binder solution causing gelation to result in an inferior applicability of an electrode-forming composition after mixing with a powdery electrode material, thus making it impossible to form a composite electrode layer according to an ordinary process including application and drying of such an electrode-forming composition. Further, it has been known that an increase in molecular weight (polymerization degree) provides a shaped product with a lowering in crystallinity (as a measure of solvent resistance), and a further increase over a certain level in molecular weight is expected to result in an increase in swellability and not to provide a further improvement in durability within a non-aqueous electrolytic solution. For these reasons, the upper limit of molecular weight of a vinylidene fluoride polymer has been believed to be 2.0 dl/g in terms of an inherent viscosity (as measured at a concentration of 4 g-resin in 1 liter of N,N-dimethylformamide, common throughout this specification) and vinylidene fluoride polymers having an inherent viscosity in the range of 0.8–1.5 dl/g have been generally used (JP-A 6-93025, U.S. Pat. No. 5,415,958, EP-A 0751157, etc.) In fact, even if a vinylidene fluoride polymer having an inherent viscosity in excess of 1.5 dl/g is once dissolved in a heated polar solvent, the resultant solution quickly causes gelation when cooled to room temperature in many cases. Further, even if an electrode-forming composition is formed by adding a powdery electrode material in a heated binder solution, the resultant composition instantaneously gels when it is applied to an electroconductive substrate, thus failing to provide an appropriate composite electrode layer. Thus, it has been believed essentially difficult to obtain an electrode-forming composition having an appropriate applicability by using a vinylidene fluoride polymer having an inherent viscosity in excess of 1.5 dl/g, particularly in excess of 2.0 dl/g. For the above reasons, though there has been a strong desire to use a reduced amount of binder, it has been generally believed necessary to use a binder in an amount of about 10 wt. % in a composite electrode layer (solid) (as disclosed in the above-mentioned patent publications).

SUMMARY OF THE INVENTION

In contrast to the above, a principal object of the present invention is to provide an electrode-forming binder solution capable of providing a composite electrode layer which can well retain or hold a powdery electrode material even at a smaller amount of vinylidene fluoride polymer than before and exhibit a good durability against a non-aqueous electrolytic solution.

Another object of the present invention is to provide an electrode-forming composition, an electrode structure or electrode sheet and further a non-aqueous-type battery, as a representative non-aqueous-type electro-chemical device, respectively exhibiting excellent performances, based on the binder solution.

According to our study, it has been discovered that a vinylidene fluoride polymer having an inherent viscosity exceeding 2.0 dl/g, which has been believed to be essentially difficult to use in view of inferior applicability of the resultant electrode-forming composition, can retain an appropriate degree of applicability when used under appropriate conditions. Particularly, it has been found possible to form a smooth composite electrode layer on an electroconductive substrate while preventing the gelation of such a high-molecular weight vinylidene fluoride polymer by retaining an elevated temperature of 30°–200° C., preferably 40°–130° C., further preferably 50°–120° C., until the formation of an electrode-forming composition and applying the electrode-forming composition at an elevated temperature onto an electroconductive substrate which is also retained at an elevated temperature of 30°–170° C., particularly 40°–170° C.; and it has been also discovered that such a high-molecular weight vinylidene fluoride polymer in the resultant composite electrode layer exhibit binder performances, represented by a powdery electrode material-retaining performance, which are remarkably improved compared with those of a conventional vinylidene fluoride polymer binder and can exhibit appropriate binder performances at a smaller amount (e.g., ca. 4 wt. % as shown in Examples appearing hereinafter). Further, it has been also recognized that the vinylidene fluoride polymer in the resultant composite electrode layer, regardless of a lowering in crystallinity, can exhibit not only an improved swelling resistance against a non-aqueous electrolytic solution, but also an improved ability of retaining a powdery electrode material such as an active substance and a remarkably improved charge-discharge cycle characteristic of the resultant battery (as described in Examples appearing hereinafter). These improvements may be attributable to a reduction in crystallite size of the vinylidene fluoride polymer and an increased entanglement between individual polymer molecules and between powdery electrode material and polymer molecules.

The present invention is based on the above discoveries and, according to a first aspect thereof, there is provided a binder solution for forming an electrode suitable for use in a non-aqueous electrolytic solution, comprising a solution of a vinylidene fluoride polymer having an inherent viscosity of above 2.0 dl/g and at most 20 dl/g in an organic solvent.

According to another aspect of the present invention, there is also provided an electrode-forming composition comprising a mixture of a powdery electrode material with the above-mentioned binder solution.

The present invention further provides an electrode structure suitable for use in a non-aqueous electrolytic solution, comprising: an electroconductive substrate, and a composite electrode layer formed on at least one surface of the electroconductive substrate; said composite electrode layer comprising a powdery electrode material and a binder comprising a vinylidene fluoride polymer having an inherent viscosity of above 2.0 dl/g and at most 20 dl/g.

The present invention further provides a process for producing an electrode structure, comprising:

forming an electrode-forming composition comprising a mixture of a powdery electrode material with a binder solution formed by dissolving a vinylidene fluoride polymer having an inherent viscosity of above 2.0 dl/g and at most 20 dl/g in an organic solvent, applying the electrode-forming composition at an elevated temperature onto at least one surface of an electroconductive substrate at an elevated temperature, and evaporating the organic solvent to form a composite electrode layer comprising the powdery electrode material and the vinylidene fluoride polymer on the electroconductive substrate.

The present invention further provides an electrode sheet suitable for use in a non-aqueous electrolytic solution, comprising: a powdery electrode material and a binder comprising a vinylidene fluoride polymer having an inherent viscosity of above 2.0 dl/g and at most 20 dl/g.

The present invention further provides a non-aqueous-type battery, comprising: a positive electrode, a negative electrode, and a non-aqueous electrolytic solution disposed between the positive and negative electrodes; wherein at least one of the positive and negative electrodes comprises an electrode structure as described above.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
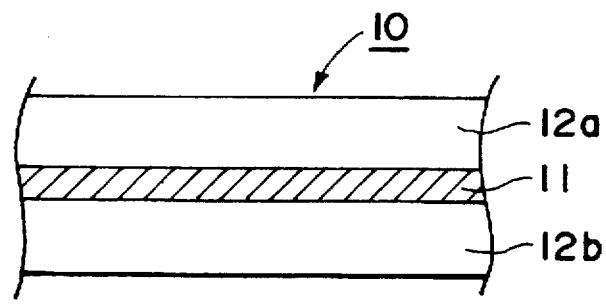
FIGS. 1 and 2 are each a partial sectional view of an embodiment of the electrode structure according to the invention.

The vinylidene fluoride polymer used in the present invention may include vinylidene fluoride homopolymer, vinylidene fluoride copolymer and modified products of these. Vinylidene fluoride homopolymer is preferred in view of resistance to a non-aqueous electrolytic solution, particularly anti-swelling property. However, the homopolymer is liable to exhibit a somewhat low adhesion onto an electroconductive substrate, e.g., metal, so that it is preferred to use a copolymer of vinylidene fluoride with another monomer, particularly an unsaturated dibasic acid monoester, a vinylene carbonate, an epoxy group-containing vinyl monomer, etc., to obtain a copolymer having a polar group, such as a carboxyl group, a carbonate group or an epoxy group (similar to those disclosed in U.S. Pat. No. 5,415,958 except for the inherent viscosity). It is also preferred to use a modified vinylidene fluoride polymer obtained by treating such a vinylidene fluoride homopolymer or copolymer in a solvent capable of dissolving or swelling such a vinylidene fluoride polymer with a silane coupling agent or titanate coupling agent having a group reactive with the vinylidene fluoride polymer, such as an amino group or a mercapto group, and a hydrolyzable group in combination (similar to those disclosed in JP-A 6-93025 except for the inherent viscosity). In order to retain a good anti-swelling resistance against a non-aqueous electrolytic solution as a whole, however, the vinylidene fluoride polymer may preferably retain at least 90 mol. %, particularly at least 95 mol. %, of untreated vinylidene fluoride units.

To the above-mentioned vinylidene fluoride polymer, it is possible to admix an organic acid, such as acrylic acid, maleic acid or fumaric acid, or a low-molecular weight compound or polymer having a good miscibility with the vinylidene fluoride polymer, such as an acrylic polymer.

The vinylidene fluoride polymer used in the present invention has an inherent viscosity of above 2.0 dl/g and at most 20 dl/g, preferably in the range of 2.5–15 dl/g, more preferably in the range of 3.0 –10.0 dl/g.

With a vinylidene fluoride polymer having an inherent viscosity up to 2.0 dl/g, it is difficult to obtain the effect of the present invention. On the other hand, a vinylidene fluoride polymer having an inherent viscosity in excess of 20 dl/g, causes not only a difficulty in dissolution thereof in a solvent but also a difficulty in suppressing the gelation of a resultant binder solution, thus being liable to fail in application of an electrode-forming composition obtained therefrom.

The vinylidene fluoride polymer used in the present invention may be prepared by polymerization of vinylidene fluoride or copolymerization of vinylidene fluoride with a comonomer copolymerizable therewith. The polymerization or copolymerization may be performed by suspension polymerization, emulsion polymerization, solution polymerization, etc.

In order to allow easy post treatment, however, it is preferred to perform suspension polymerization or emulsion polymerization in an aqueous medium, particularly aqueous suspension polymerization.

In such suspension polymerization using water as a dispersion medium, it is possible to use a suspension aid, such as methyl cellulose, methoxylated methyl cellulose, propoxidized methyl cellulose, hydroxyethyl cellulose, hydroxypropyl cellulose, polyvinyl alcohol, polyethylene oxide or gelatin in a proportion of 0.005–1.0 wt. %, preferably 0.01–0.4 wt. %, based on the water.

It is possible to use a polymerization initiator, such as diisopropyl peroxydicarbonate, dinormalpropyl peroxydicarbonate, dinormalheptafluoropropyl peroxydicarbonate, isobutyryl peroxide, di(chlorofluoroacyl) peroxide, or di(perfluoroacyl) peroxide. Such a polymerization initiator may be used in a proportion of 0.1–5 wt. %, preferably 0.5–2 wt. %, of the total monomer amount.

It is also possible to add a chain transfer agent, such as ethyl acetate, methyl acetate, acetone, ethanol, n-propanol, acetaldehyde, propylaldehyde, ethyl propionate, or carbon tetrachloride, so as to control the polymerization degree of the resultant copolymer. Such a chain transfer agent may be used in an amount of 0.1–5 wt. % of the total monomer amount in a conventional vinylidene fluoride polymerization system but, in order to provide a vinylidene fluoride polymer having a much higher polymerization degree than a conventional one, it is preferred to suppress the amount of a chain transfer agent to at most 0.5 wt. %.

As described above, the vinylidene fluoride polymer having an increased inherent viscosity (and accordingly an increased polymerization degree) may be produced principally by suppressing the amount of a chain transfer agent and by superpressing the amount of a polymerization initiator which per se may be within known techniques for production of vinylidene fluoride polymers.

The organic solvent used for dissolving the vinylidene fluoride polymer to provide the binder solution according to the present invention may preferably be a polar one, examples of which may include: N-methyl-2-pyrrolidone, dimethylformamide, N,N-dimethylacetamide, N,N-dimethylsulfoxide, hexamethylphosphamide, dioxane, tetrahydrofuran, tetramethylurea, triethyl phosphate, and trimethyl phosphate. As the vinylidene fluoride polymer used in the present invention has a much larger polymerization degree than a conventional one, it is further preferred to use a nitrogen-containing organic solvent having a larger dissolving power, such as N-methyl-2-pyrrolidone, dimethylformamide or N,N-dimethylacetamide among the above-mentioned organic solvents. These organic solvents may be used singly or in mixture of two or more species.

For obtaining the binder solution according to the present invention, it is preferred to dissolve 0.1–10 wt. parts, particularly 1–5 wt. parts, of the above-mentioned vinylidene fluoride polymer in 100 wt. parts of such an organic solvent. Below 0.1 wt. part, the polymer occupies too small a proportion in the solution, thus being liable to fail in exhibiting its performance of binding the powdery electrode material. Above 10 wt. parts, because of a high polymerization degree of the vinylidene fluoride polymer, the solution is liable to have an abnormally high viscosity, so that not only the preparation of the electrode-forming composition becomes difficult but also the suppression of gelation of the electrode-forming composition becomes difficult, thus being liable to fail in uniform application thereof onto an electroconductive substrate, in extreme cases.

In order to prepare the vinylidene fluoride polymer binder solution according to the present invention, it is preferred to dissolve the vinylidene fluoride polymer in an organic solvent at an elevated temperature of 30°–200° C., more preferably 40°–130° C., further preferably 50°–120° C. Below 30° C., the dissolution requires a long time and a uniform dissolution becomes difficult.

An electrode-forming composition may be obtained by adding and dispersing a powdery electrode material (an active substance for a battery or an electric double layer capacitor, and optional additives, such as an electroconductivity-imparting additive) into the thus-obtained vinylidene fluoride polymer binder solution according to the present invention.

In the case of forming a positive electrode for a lithium ion battery, the active substance may comprise a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCo_{1-x}O_2$ (0<x<1), and spinel-structured $LiMn_2O_4$.

In the case of forming a negative electrode for a lithium battery, the active substance may preferably comprise a carbonaceous material, such as graphite, activated carbon or a carbonaceous material obtained by carbonization of phenolic resin, pitch, etc. The carbonaceous material may preferably be used in the form of particles having an average diameter of ca. 0.5–100 μm.

An electroconductivity-imparting additive may be added in order to improve the conductivity of a resultant composite electrode layer formed by applying and drying of the electrode-forming composition of the present invention, particularly in case of using an active substance, such as $LiCoO_2$, showing a small electron-conductivity. Examples thereof may include: carbonaceous materials, such as carbon black, graphite fine powder and fiber, and fine powder and fiber of metals, such as nickel and aluminum. In the case of using a carbonaceous material having a large electroconductivity as an electrode material, it is unnecessary to add such an electroconductivity-imparting additive.

The active substance for an electric double layer capacitor may preferably comprise fine particles or fiber, such as activated carbon, activated carbon fiber, silica or alumina particles, having an average particle (or fiber) diameter of 0.5–10.0 μm and a specific surface area of 100–3000 $m^2/g$, i.e., having a relatively small particle (or fiber) diameter and a relatively large specific surface area compared with those of active substances for batteries.

The electrode-forming composition according to the present invention may preferably be formed by mixing 100 wt. parts of the powdery electrode material with the binder solution containing 0.1–50 wt. parts, particularly 1–20 wt. parts of the vinylidene fluoride polymer. The mixing may preferably be performed also at an elevated temperature similarly as that for the above-mentioned binder solution formation, i.e., 30°–200° C., more preferably 50°–120° C., so as to prevent the gelation of the vinylidene fluoride polymer.

Figure 2:
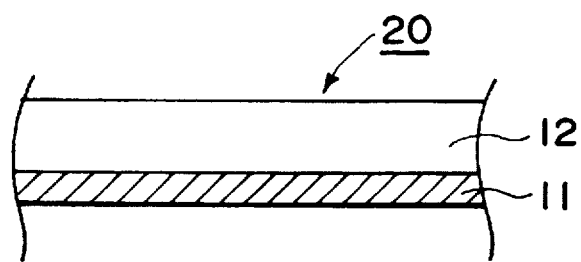

The thus-prepared electrode-forming composition may be used for forming electrode structures having partial sectional structures as shown in FIG. 1 and FIG. 2. More specifically, the electrode-forming composition may be applied onto both surfaces (FIG. 1) or one surface (FIG. 2) of an electroconductive substrate 11 comprising a foil or wire net of a metal, such as iron, stainless steel, steel, copper, aluminum, nickel or titanium and having a thickness of, e.g., 5–100 μm, or 5–20 μm for a small-sized device, and dried at, e.g., 50°–170° C. to form a composite electrode layer (12a, 12b or 12) of, e.g., 10–1000 μm in thickness for a small-sized device, thereby providing an electrode structure (10 or 20). In this instance, the electrode-forming composition may preferably be continually held at the above-mentioned elevated temperature and applied onto the electroconductive substrate also held at an elevated temperature of 30°–200° C., particularly 40°–170° C., followed by the drying, to form a uniform composite electrode layer while effectively preventing the gelation of the vinylidene fluoride polymer.

Alternatively, it is also possible to form an electrode structure similar to the one shown in FIG. 1 or FIG. 2 by once forming a composite electrode layer 12 as shown in FIG. 2 on an electroconductive substrate 11 or an arbitrary substrate having a better releasability by application and drying, then peeling only the composite electrode layer 12 apart from the substrate to obtain an electrode sheet, and then applying the electrode sheet onto an electroconductive substrate 11 with an electroconductive adhesive by a manufacturer of an electrochemical device, such as a battery.

Figure 3:
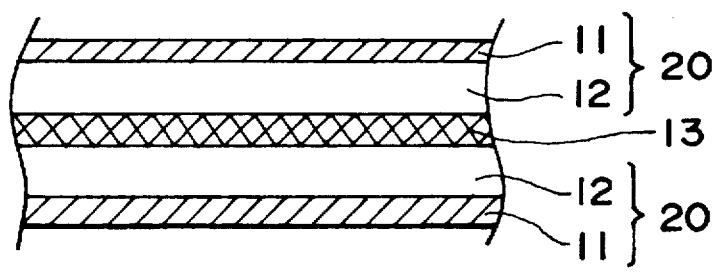
FIG. 3 is a partial sectional view schematically showing a laminate structure of an electric double layer capacitor which can be constituted according to the invention.

The thus-formed electrode structure 10 or 20 may preferably be used as an electrode for a battery or an electric double layer capacitor wherein it is used in the state of being dipped in a non-aqueous electrolytic solution. For example, a laminate structure as shown in FIG. 3 may be formed by disposing a pair of electrode structures 20 shown in FIG. 2 so that their composite electrode layers 12 are disposed on inner sides and opposite to each other, disposing a liquid permeable separator 13 so as to be sandwiched between the composite electrode layers 12, and impregnating the composite electrode layers 12 and the separator 13 with a non-aqueous electrolytic solution. Such a laminate structure as shown in FIG. 3 may constitute a battery or an electric double layer capacitor.

Further, the electrode structure according to the present invention, preferably in the form of an electrodes structure 10 (FIG. 1) having composite electrode layers 12a and 12b on both sides, may be used as a positive electrode or a negative electrode of a non-aqueous-type battery, particularly a lithium ion battery.

Figure 4:
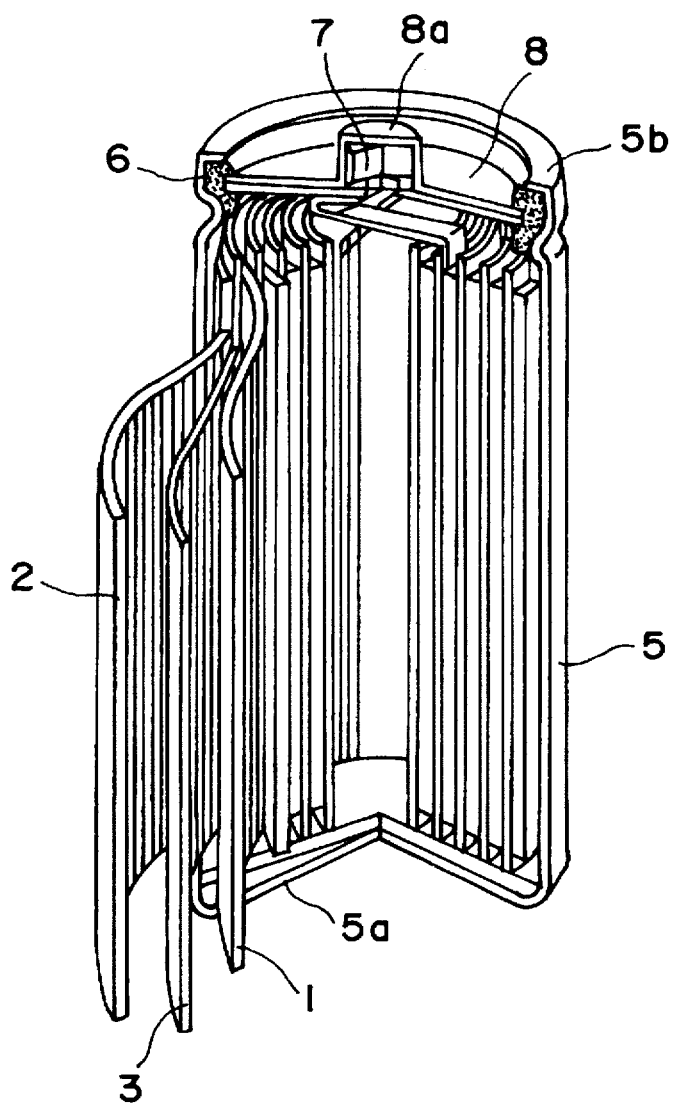
FIG. 4 is a partially exploded perspective view of a non-aqueous-type secondary battery which can be constituted according to the invention.

FIG. 4 is a partially exploded perspective view of a lithium secondary battery as an embodiment of a non-aqueous-type battery according to the present invention, including an electrode structure prepared in the above-described manner.

More specifically, the secondary battery basically includes a laminate structure including a positive electrode 1, a negative electrode 2 and a separator 3 disposed between the positive and negative electrodes 1 and 2 and comprising a fine porous film of a polymeric material, such as polyethylene or polypropylene, impregnated with an electrolytic solution. The laminate structure is wound in a vortex shape to form an electricity-generating element which is housed within a metal casing 5 having a bottom constituting a negative electrode terminal 5a. In the secondary battery, the negative electrode 2 is electrically connected to the negative electrode terminal 5a, and the uppermost portion of the battery is constituted by disposing a gasket 6 and a safety valve 7 covered with a top plate 8 having a projection constituting a positive electrode terminal 8a electrically connected to the positive electrode. Further, the uppermost rim 5b of the casing 5 is crimped toward the inner side to form an entirely sealed cell structure enclosing the electricity-generating element. The positive electrode 1 and the negative electrode 2 may have a structure of the electrode structure 10 or 20 shown in FIG. 1 or 2.

The composite electrode layer (12a, 12b or 12) may be formed in the above-described manner, i.e., by forming a layer of a composite electrode material comprising a powdery electrode material (a fine powdery or fibrous active substance, and optionally added electroconductivity-imparting additive, such as carbon) and a vinylidene fluoride polymer binder, applied onto an electroconductive substrate (11) as described above.

The non-aqueous electrolyte solution impregnating the separator 3 may comprise a solution of an electrolyte, such as a lithium salt, in a non-aqueous solvent (organic solvent).

Examples of the electrolyte may include: $LiPF_6$, $LiAsF_6$, $LiClO_3$, $LiBF_4$, $CH_3SO_3Li$, $CF_3SO_3Li$, $LiN(SO_2CF_3)_2$, $LiC(SO_2CF_3)_3$, $LiCl$, and $LiBr$. Examples of the organic solvent for such an electrolyte may include: propylene carbonate, ethylene carbonate, 1,2-dimethoxyethane, 1,2-diethoxyethane, dimethyl carbonate, diethyl carbonate, methyl ethyl carbonate, γ-butyrolactone, methyl propionate, ethyl propionate, and mixtures of these, but they are not exhaustive.

In the above, a cylindrical battery has been described as an embodiment of the non-aqueous-type battery according to the present invention. However, the non-aqueous-type battery according to the present invention can basically have any other shapes, such as those of a coin, a rectangular parallelepiped, or a paper or sheet.

[EXAMPLES]

Hereinbelow, the present invention will be described more specifically based on Examples and Comparative Examples.

The inherent viscosity, crystallinity and swellability of vinylidene fluoride polymers obtained were measured in the following manners, and these values referred to herein are all based on values measured in the following manners.

[INHERENT VISCOSITY]

80 mg of a powdery sample was dissolved in 20 ml of N,N-dimethylformamide, and the viscosity of the resultant polymer solution was measured by an Ubbelohde viscometer in a thermostat vessel at 30° C. to calculate an inherent viscosity $\eta_i$ (dl/g) according to the following equation:

$$\eta_i = (1/C) \cdot ln(\eta/\eta_0),$$

wherein $\eta$ denotes a measured viscosity of a polymer solution; $\eta_0$, a viscosity of solvent N,N-dimethylformamide; and C, a concentration of the solution (=0.4 g/dl).

[CRYSTALLINITY]

A sample polymer solution in N-methyl-2-pyrrolidone (at a concentration of 2 wt. % for Examples and 10 wt. % of Comparative Examples, respectively appearing hereinafter) heated at 50° C. was cast onto a glass sheet and immediately dried for 3 hours in a thermostat vessel at 130° C. The cast film was peeled apart from the glass sheet and then further dried at 120° C. under a reduced pressure to prepare a ca. 100 μm-thick film. The film was subjected to X-ray diffractometry to measure a crystallinity.

[SWELLABILITY]

A cast film in a size of 17 mm×35 mm prepared in the above-described manner for the crystallinity measurement was dipped for 6 days at 70° C. in an electrolytic solution having the following composition, and the percentage weight increase of the dipped film was measured as a swellability.

| (Electrolytic solution) | |
|---|---|
| Propylene carbonate | 52.7 wt. % |
| 1,2-Dimethoxyethane | 38.0 wt. % |
| LiClO$_4$ (electrolyte) | 9.3 wt. % |

Example 1

In a 2 liter-autoclave, 1075 g of deionized water, 0.4 g of methyl cellulose, 420 g of vinylidene fluoride and 2.8 g of diisopropyl peroxydicarbonate (IPP) were charged and subjected to suspension polymerization at 25° C.

After the polymerization, the polymerizate slurry was de-watered, washed with water, de-watered and dried at 80° C. for 20 hours to obtain a powdery polymer.

The thus-obtained vinylidene fluoride polymer showed an inherent viscosity of 2.5 (dl/g).

Example 2

In a 2 liter-autoclave, 1075 g of deionized water, 0.4 g of methyl cellulose, 420 g of vinylidene fluoride and 1.9 g of diisopropyl peroxydicarbonate (IPP) were charged and subjected to suspension polymerization at 25° C.

After the polymerization, the polymerizate slurry was de-watered, washed with water, de-watered and dried at 80° C. for 20 hours to obtain a powdery polymer.

The thus-obtained vinylidene fluoride polymer showed an inherent viscosity of 3.1 (dl/g).

Example 3

Suspension polymerization was performed in the same manner as in Examples 1 and 2 except that the charged amount of diisopropyl peroxydicarbonate (IPP) as reduced to 0.8 g, and the polymerizate was also post-treated in the same manner to obtain a powdery polymer.

The vinylidene fluoride polymer showed an inherent viscosity of 5.1.

Example 4

Suspension polymerization was performed in the same manner as in Examples 1 and 2 except that the charged amount of diisopropyl peroxydicarbonate (IPP) was reduced to 0.2 g, and the polymerizate was also post-treated in the same manner to obtain a powdery polymer.

The vinylidene fluoride polymer showed an inherent viscosity of 8.8.

Comparative Example 1

In a 2 liter-autoclave, 1040 g of deionized water, 0.4 g of methyl cellulose, 400 g of vinylidene fluoride, 2 g of di-n-propyl peroxydicarbonate (NPP) and 8 g of ethyl acetate were charged and subjected to suspension polymerization at 25° C.

After the polymerization, the polymerizate slurry was de-watered, washed with water, de-watered and dried at 80° C. for 20 hours to obtain a powdery polymer.

The thus-obtained vinylidene fluoride polymer showed an inherent viscosity of 1.1.

Comparative Example 2

In a 2 liter-autoclave, 1075 g of deionized water, 0.4 g of methyl cellulose, 420 g of vinylidene fluoride and 2.5 g of di-n-propyl peroxydicarbonate (NPP) were charged and subjected to suspension polymerization at 25° C.

After the polymerization, the polymerizate slurry was de-watered, washed with water, de-watered and dried at 80° C. for 20 hours to obtain a powdery polymer.

The thus-obtained vinylidene fluoride polymer showed an inherent viscosity of 1.6.

The values of inherent viscosity, film crystallinity and film swellability for each of the vinylidene fluoride polymers prepared in the above Examples and Comparative Examples measured in the above-described manner are inclusively shown in the following Table 1.

TABLE 1

| Example No. | Inherent viscosity $\eta_i$ (dl/g) | Film crystallinity (%) | Film swellability (%) |
|---|---|---|---|
| Ex. 1 | 2.5 | 47.0 | 15.2 |
| 2 | 3.1 | 43.3 | 14.3 |
| 3 | 5.1 | 42.6 | 13.8 |
| 4 | 8.8 | 40.8 | 13.0 |
| Comp. Ex. 1 | 1.1 | 51.0 | 20.6 |
| 2 | 1.6 | 48.9 | 18.2 |

Example 5

0.30 g of the vinylidene fluoride polymer ($\eta_i$=2.5) prepared in Example 1 was uniformly dissolved in 14.7 g of the N-methylpyrrolidone (NMP) at 60° C. to prepare a binder solution, into which 2.7 g of a powdery carbonaceous material of pitch origin having an average particle size of ca. 20 μm and a specific surface area of ca. 3 m$^2$/g was added and uniformly mixed and dispersed by a homogenizer to form a pasty electrode-forming composition.

The electrode-forming composition had a fraction (herein used to mean a weight percentage of a polymer with respect to the total weight of the polymer and a powdery electrode material (powdery carbonaceous material in this composition)) of 10 wt. %.

The electrode-forming composition was applied by a doctor blade onto one surface of a 20 μm-thick copper foil warmed at ca. 50° C. and dried under heating at 130° C. for 15 min. to form a totally 180 μm-thick electrode structure.

Example 6

0.12 g of the vinylidene fluoride polymer ($\eta_i$=2.5) prepared in Example 1 was uniformly dissolved in 5.9 g of NMP at 60° C. to form a binder solution, into which 2.9 g of the powdery carbonaceous material was added and uniformly dispersed at 60° C. by a homogenizer in the same manner as in Example 5 to prepare a pasty electrode-forming composition having a polymer fraction of 4 wt. %.

The electrode-forming composition was applied by a doctor blade onto one surface of a 20 μm-thick copper foil warmed at ca. 50° C. and dried under heating to form a totally 180 μm-thick electrode structure.

Example 7

0.12 g of the vinylidene fluoride polymer ($\eta_i$=3.1) prepared in Example 2 was dissolved in NMP and blended with the powdery carbonaceous material similarly as in Example 6 to prepare an electrode-forming composition having a polymer fraction of 4 wt. %.

The electrode-forming composition was applied by a doctor blade onto one surface of a 20 μm-thick copper foil and dried under heating in the same manner as in Example 5 to prepare a totally 185 μm-thick electrode structure.

Example 8

0.12 g of the vinylidene fluoride polymer ($\eta_i$=5.1) prepared in Example 3 was dissolved in NMP and blended with the powdery carbonaceous material similarly as in Example 6 to prepare an electrode-forming composition having a polymer fraction of 4 wt.

The electrode-forming composition was applied by a doctor blade onto one surface of a 20 μm-thick copper foil and dried under heating in the same manner as in Example 5 to prepare a totally 170 μm-thick electrode structure.

Example 9

0.12 g of the vinylidene fluoride polymer ($\eta_i$=8.8) prepared in Example 4 was dissolved in NMP and blended with the powdery carbonaceous material similarly as in Example 6 to prepare an electrode-forming composition having a polymer fraction of 4 wt. %

The electrode-forming composition was applied by a doctor blade onto one surface of a 20 μm-thick copper foil and dried under heating in the same manner as in Example 5 to prepare a totally 180 μm-thick electrode structure.

Example 10

(Carboxyl group-containing vinylidene fluoride polymer)

In a 2 liter-autoclave, 1040 g of deionized water, 0.8 g of methyl cellulose, 2 g of diisopropyl peroxydicarbonate (IPP), 396 g of vinylidene fluoride and 4 g of monomethyl maleate (giving a vinylidene fluoride/monomethyl maleate (mol ratio)=100/1.01) were charged and subjected to suspension polymerization at 28° C.

After the polymerization, the polymerizate slurry was de-watered, washed with water, de-watered and dried at 80° C. for 20 hours to obtain a powdery polymer.

The thus-obtained vinylidene fluoride copolymer showed an inherent viscosity of 2.9.

0.12 g of the copolymer was dissolved in NMP and blended with the powdery carbonaceous material similarly as in Example 6 to prepare an electrode-forming composition having a polymer fraction of 4 wt.

The electrode-forming composition was applied by a doctor blade onto one surface of a 20 μm-thick copper foil and dried under heating in the same manner as in Example 5 to prepare a totally 180 μm-thick electrode structure.

Comparative Example 3

0.3 g of the vinylidene fluoride polymer ($\eta_i$=1.1) prepared in Comparative Example 1 was dissolved (at a concentration of 10 wt. %) in NMP and blended with the powdery carbonaceous material similarly as in Example 5 to prepare an electrode-forming composition having a polymer fraction of 10 wt. %.

The electrode-forming composition was applied by a doctor blade onto one surface of a 20 μm-thick copper foil and dried under heating in the same manner as in Example 5 to prepare a totally 180 μm-thick electrode structure.

Comparative Example 4

0.12 g of the vinylidene fluoride polymer ($\eta_i$=1.1) prepared in Comparative Example 1 was dissolved (at a concentration of 10 wt. %) in NMP and blended with the powdery carbonaceous material similarly as in Example 6 to prepare an electrode-forming composition having a polymer fraction of 4 wt. %.

The electrode-forming composition was applied by a doctor blade onto one surface of a 20 μm-thick copper foil and dried under heating in the same manner as in Example 5 to prepare a totally 175 μm-thick electrode structure.

Comparative Example 5

0.3 g of the vinylidene fluoride polymer ($\eta_i$=1.6) prepared in Comparative Example 2 was dissolved (at a concentration of 10 wt. %) in NMP and blended with the powdery carbonaceous material similarly as in Example 5 to prepare an electro-deforming composition having a polymer fraction of 10 wt. %.

The electrode-forming composition was applied by a doctor blade onto one surface of a 20 μm-thick copper foil and dried under heating in the same manner as in Example 5 to prepare a totally 185 μm-thick electrode structure.

Comparative Example 6

0.12 g of the vinylidene fluoride polymer ($\eta_i$=1.6) prepared in Comparative Example 2 was dissolved (at a concentration of 4 wt. %) in NMP and blended with the powdery carbonaceous material similarly as in Example 6 to prepare an electrode-forming composition having a polymer fraction of 4 wt. %.

The electrode-forming composition was applied by a doctor blade onto one surface of a 20 μm-thick copper foil and dried under heating in the same manner as in Example 5 to prepare a totally 180 μm-thick electrode structure.

Example 11

0.15 g of vinylidene fluoride polymer ($\eta_i$=5.1) prepared in Example 3 was blended with 2.85 g of activated carbon powder (average particle size=5 μm, specific surface area= 200 m$^2$/g) and 10.1 g of NMP to form an electrode-forming composition having a polymer fraction of 5 wt. %. The composition was applied onto one surface of a 20 μm-thick copper foil and dried under heating in the same manner as in Example 5 to prepare a totally 190 μm-thick electrode structure for an electric double layer capacitor.

Comparative Example 7

0.30 g of vinylidene fluoride polymer ($\eta_i$=1.1) prepared in Comparative Example 1 was blended with 2.80 g of activated carbon powder (the same as in Example 11) and 6.50 g of NMP to form an electrode-forming composition having a polymer fraction of 10 wt. %. The composition was applied onto one surface of a 20 μm-thick copper foil and dried under heating in the same manner as in Example 5 to prepare a totally 220 μm-thick electrode structure for an electric double layer capacitor.

Comparative Example 8

0.30 g of vinylidene fluoride polymer ($\eta_i$=1.6) prepared in Comparative Example 2 was blended with 2.70 g of activated carbon powder (the same as in Example 11) and 6.50 g of NMP to form an electrode-forming composition having a polymer fraction of 10 wt. %. The composition was applied onto one surface of a 20 μm-thick copper foil and dried under heating in the same manner as in Example 5 to prepare a totally 230 μm-thick electrode structure for an electric double layer capacitor.

[ELECTRODE EVALUATION TEST]

The electrode structures suitable for use in lithium batteries prepared in Examples 5–10 and Comparative Examples 3–6 and the electrode structures for electric double layer capacitors prepared in Examples 11–12 and Comparative Examples 7–8, were respectively evaluated with respect to the states of the coating surface of the composite electrode layer and a cut edge surface of the composite electrode layer after cutting in a length of ca. 10 mm of the electrode structure across its thickness.

(Active substance retention power)

The surface of a sample composite electrode layer was rubbed by a finger at a constant pressure of ca. 40–50 g/cm$^2$, and the active substance retention power was evaluated by the degree of the attachment of the composite electrode material onto the finger.

A: No attachment onto the finger at all.
B: Slight attachment onto the finger.
C: Remarkable attachment onto the finger.

(Edge surface state after cutting)

A sample electrode structure was cut by a cutter knife from the composite electrode layer surface to the opposite side and the state of the cut edge surface of the composite electrode layer was evaluated according to the following standard.

A: No partial peeling of the composite electrode layer at all.

B: Some partial peeling of the composite electrode layer was observed.

C: The composite electrode layer was peeled and could fall off.

The results are inclusively shown in the following Table 2.

TABLE 2

| | Polymer | | | Electrode evaluation | |
|---|---|---|---|---|---|
| Sample | $\eta_i$ (dl/g) | fraction (wt. %) | Electrode filler* | Retention power | Cut edge state |
| Ex. 5 | 2.5 | 10 | PO | A | A |
| 6 | 2.5 | 4 | PO | A | A |
| 7 | 3.1 | 4 | PO | A | A |
| 8 | 5.1 | 4 | PO | A | A |
| 9 | 8.8 | 4 | PO | A | A |
| 10 | 2.9 | 4 | PO | A | A |
| 11 | 5.1 | 5 | AC | A | A |
| 12 | 2.9 | 5 | AC | A | A |
| Comp. Ex. 3 | 1.1 | 10 | PO | A | A |
| 4 | 1.1 | 4 | PO | B | B |
| 5 | 1.6 | 10 | PO | A | A |
| 6 | 1.6 | 4 | PO | B | B |
| 7 | 1.1 | 10 | AC | C | C |
| 8 | 1.6 | 10 | AC | C | C |

*Filler of the composite electrode layer
PO: Powdery carbonaceous material of pitch origin.
AC: Activated carbon powder.

[Battery cycle performance test]

Electrode-forming compositions having the same compositions as in Example 8, Example 10 and Comparative Example 4 were respectively used for preparation of coin-shaped non-aqueous-type secondary batteries (Cells 1, 2 and 3, respectively), and their cycle performances in repetition of charge-discharge cycle were evaluated in the following manner.

More specifically, each pasty electrode-forming composition was uniformly applied onto an aluminum foil and dried. Then, the dried composite electrode layer was peeled apart from the aluminum foil and stamped into a disk of 15 mm in diameter. Then, the disk-shaped composite electrode was press-bonded onto a 17 mm-dia. stainless steel mesh disk to form a negative electrode having a ca. 130 μm-thick composite electrode layer.

Separately, a positive electrode was prepared from a pasty composition obtained by mixing 90 wt. parts of LiCoO$_2$ (active substance), 7 wt. parts of carbon black (electroconductivity-imparting additive), 3 wt. parts of vinylidene fluoride polymer ($\eta_i$=1.3 dl/g) and 56 wt. parts of NMP. The composition was uniformly applied onto an aluminum foil and dried. Then, the dried composition layer was peeled apart from the aluminum foil and stamped into a 14 mm-dia. disk. The disk was press-bonded onto a 16 mm-dia. stainless steel mesh disk to form a positive electrode having a ca. 100 μm-thick composite electrode layer.

The thus-formed positive electrode was commonly used for preparation of the respective batteries (cells) in combination with the respective negative electrodes prepared in the above-described manner. An electrolytic solution was prepared by adding LiPF$_6$ (electrolyte) at a rate of 1 mol/l in a 1:1 (by volume) mixture solvent of ethylene carbonate and diethyl carbonate. A 25 μm-thick separator of porous polypropylene membrane was impregnated with the electrolytic solution and sandwiched between the positive electrode and each negative electrode to form three types of non-aqueous-type lithium secondary batteries (Cells 1–3).

Each of the thus-prepared lithium secondary batteries (Cells 1–3) was subjected to repetition of a charge-discharge cycle at a constant current of 2.5 mA, while measuring the discharge capacity of the battery at each cycle. The discharge capacity was expressed as a value (mAh/g) per unit weight of negative electrode active substance obtained by dividing the discharged electricity (mAh) of the battery by the weight of the powdery carbonaceous material (negative electrode active substance) in the negative electrode.

Figure 5:
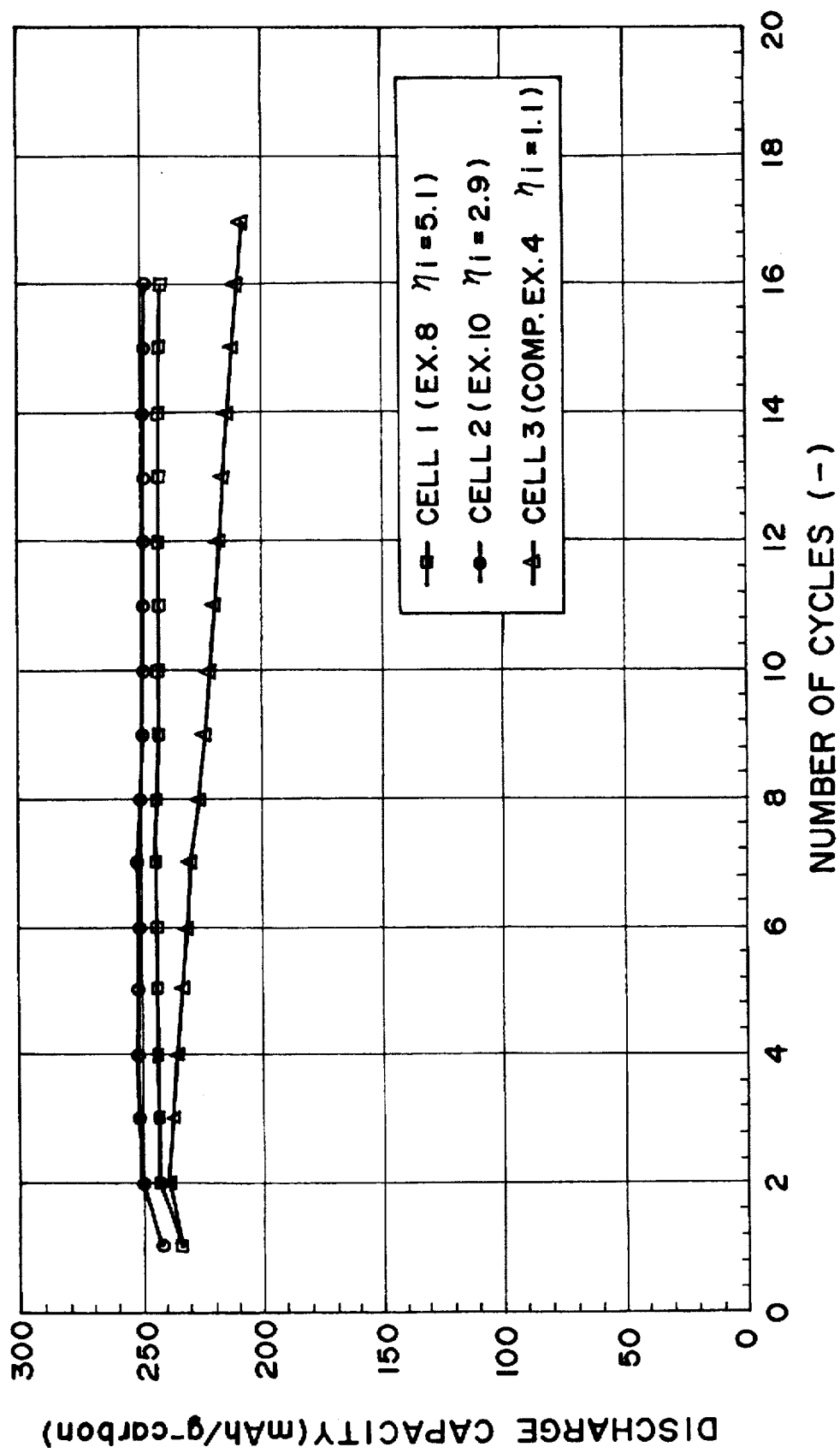
FIG. 5 is a graph showing cycle characteristics of coin-shaped lithium batteries including negative electrodes formed by using electrode-forming compositions according to Examples 8 and 10 and Comparative Example 4.

The results of the cycle performance test are shown in FIG. 5 and the inherent viscosity of polymer and polymer fraction in the negative electrodes of the respective batteries are summarized in the following Table 3.

TABLE 3

| Cell | Negative electrode | | |
|---|---|---|---|
| | Polymer $\eta_i$ (dl/g) | Polymer fraction (wt. %) | Composition |
| 1 | 5.1 | 4 | Ex. 8 |
| 2 | 2.9 | 4 | Ex. 10 |
| 3 | 1.1 | 4 | Comp. Ex. 4 |

As is clear from FIG. 5, the batteries (Cells 1 and 2) prepared by using the electrode-forming compositions (Examples 8 and 10) of the present invention containing a high-molecular weight vinylidene fluoride polymer exhibited a stable discharge capacity for a large number of charge-discharge cycles, whereas the battery (Cell 3) prepared by using the electrode-forming composition (Comparative Example 4) containing a vinylidene fluoride polymer of a conventional level of molecular weight exhibited a remarkably lowering discharge capacity at an increased number of charge-discharge cycles.

As described above, according to the present invention, there is provided an electrode-forming vinylidene fluoride polymer-based binder solution capable of providing an electrode suitable for use in a non-aqueous electrolytic solution by dissolving in an organic solvent a vinylidene fluoride polymer having a polymerization degree which is much higher than a conventional level. The electrode can well hold a powdery electrode material and exhibit a good durability against a non-aqueous electrolytic solution at a smaller amount of vinylidene fluoride polymer than in a conventional level. Accordingly, by using the binder solution, it is possible to obtain an electrode-forming composition, an electrode structure or electrode and a non-aqueous-type battery as a representative of a non-aqueous-type electrochemical device, respectively showing good performances.

What is claimed is:

1. An electrode-forming composition, comprising a solution of a vinylidene fluoride polymer having an inherent viscosity of above 2.0 dl/g and at most 20 dl/g in an organic solvent, and a powdery electrode material dispersed in the solution.

2. An electrode-forming composition to according to claim 1, wherein said vinylidene fluoride polymer is a homopolymer of vinylidene fluoride.

3. An electrode-forming composition according to claim 1, wherein said vinylidene fluoride polymer is (1) a vinylidene fluoride homopolymer, (2) a copolymer of at least 95 mol. % of vinylidene fluoride and a monomer copolymerizable with vinylidene fluoride, or (3) a modified product of said homopolymer or copolymer.

4. An electrode-forming composition according to claim 1, wherein said vinylidene fluoride polymer is a carboxyl group-containing vinylidene fluoride polymer.

5. An electrode-forming composition according to claim 1, formed by mixing the powdery electrode material with the solution at an elevated temperature.

6. An electrode-forming composition according to claim 1, held at an elevated temperature for preventing gelation.

7. An electrode structure suitable for use in a non-aqueous electrolytic solution, comprising: an electroconductive substrate, and a composite electrode layer formed on at least one surface of the electroconductive substrate; said composite electrode layer comprising a powdery electrode material and a binder comprising a vinylidene fluoride polymer having an inherent viscosity of above 2.0 dl/g and at most 20 dl/g.

8. A process for producing an electrode structure, comprising:

forming an electrode-forming composition comprising a mixture of a powdery electrode material with a binder solution formed by dissolving a vinylidene fluoride polymer having an inherent viscosity of above 2.0 dl/g and at most 20 dl/g in an organic solvent, applying the electrode-forming composition having an elevated temperature onto at least one surface of an electroconductive substrate held at an elevated temperature, and evaporating the organic solvent to form a composite electrode layer comprising the powdery electrode material and the vinylidene fluoride polymer on the electroconductive substrate.

9. An electrode sheet suitable for use in a non-aqueous electrolytic solution, comprising: a powdery electrode material and a binder comprising a vinylidene fluoride polymer having an inherent viscosity of above 2.0 dl/g and at most 20 dl/g.

10. A non-aqueous-type battery, comprising: a positive electrode, a negative electrode, and a non-aqueous electrolytic solution disposed between the positive and negative electrodes;

wherein at least one of the positive and negative electrodes has an electrode structure comprising: an electroconductive substrate, and a composite electrode layer formed on at least one surface of the electroconductive substrate; said composite electrode layer comprising a powdery electrode material and a binder comprising a vinylidene fluoride polymer having an inherent viscosity of above 2.0 dl/g and at most 20 dl/g.

11. An electrode-forming composition according to claim 1, wherein said powdery electrode material comprises a carbonaceous material in the form of particles having an average diameter of 0.5–100 μm.

* * * * *